(12) United States Patent
Jayapalan et al.

(10) Patent No.: US 12,427,901 B2
(45) Date of Patent: Sep. 30, 2025

(54) PLATE AND ENCLOSURE ASSEMBLY FOR USE IN CONSTRUCTION EQUIPMENT

(71) Applicant: Caterpillar Paving Products Inc., Brooklyn Park, MN (US)

(72) Inventors: Saravanan Jayapalan, Chennai (IN); Joel N. Thieschafer, Maple Grove, MN (US); Harikumar Chellaswamy, Chennai (IN); Siva Subramanian, Chennai (IN)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 309 days.

(21) Appl. No.: 18/182,739

(22) Filed: Mar. 13, 2023

(65) Prior Publication Data

US 2024/0308404 A1 Sep. 19, 2024

(51) Int. Cl.
*B60N 2/90* (2018.01)
*B60N 2/14* (2006.01)
*B60N 2/02* (2006.01)

(52) U.S. Cl.
CPC .............. *B60N 2/933* (2018.02); *B60N 2/14* (2013.01); *B60N 2/0272* (2023.08)

(58) Field of Classification Search
CPC ...... A47C 3/18; A61G 5/1072; B60N 2/3052; B61D 33/0085
USPC ........................... 297/344.21, 463.1; 248/660
See application file for complete search history.

(56) References Cited

U.S. PATENT DOCUMENTS

| | | | |
|---|---|---|---|
| 6,447,065 B1* | 9/2002 | Ropp | A47C 3/18 297/344.21 |
| 6,768,065 B2 | 7/2004 | Bertenburg et al. | |
| 7,513,571 B2 | 4/2009 | Hofmann et al. | |
| 7,518,073 B2 | 4/2009 | Sallam et al. | |
| 7,950,740 B2* | 5/2011 | Bunea | B64D 11/064 297/344.21 |
| 9,428,080 B2 | 8/2016 | Kordel et al. | |
| 9,533,603 B2 | 1/2017 | Kordel et al. | |
| 10,292,497 B1* | 5/2019 | Perkins | A47C 9/00 |
| 12,245,702 B2* | 3/2025 | Hayashi | A47C 3/18 |

(Continued)

FOREIGN PATENT DOCUMENTS

| | | |
|---|---|---|
| DE | 19847603 A1 | 4/2000 |
| DE | 102013213798 B4 | 4/2019 |
| EP | 2883741 B1 | 2/2018 |

OTHER PUBLICATIONS

Caterpillar Inc., image of plate sensor, Caterpillar part No. 358-9315, 1 p. (the pictured plate was part of a machine available for sale prior to the filing date of the present application).

*Primary Examiner* — Jose V Chen

(57) ABSTRACT

A plate includes: a sensor face; a plate base surface disposed opposite the sensor face in an axial direction; an inner passage connecting the sensor face to the plate base surface; and a blocking surface disposed axially between the sensor face and the plate base surface. The plate base surface is connected to the blocking surface by an inner periphery having an inner periphery diameter. The blocking surface is connected to the sensor face by an outer periphery having an outer periphery diameter and a middle periphery having a middle periphery diameter, the outer periphery transitioning to the middle periphery at two circumferential reductions.

20 Claims, 9 Drawing Sheets

(56) References Cited

U.S. PATENT DOCUMENTS

| | | | |
|---|---|---|---|
| 2004/0195886 A1* | 10/2004 | Beatty | B60N 2/938 297/344.21 |
| 2014/0028069 A1* | 1/2014 | Weiss | A47C 3/18 297/344.21 |
| 2014/0167469 A1* | 6/2014 | Haller | B60N 2/06 297/344.21 |
| 2014/0292053 A1* | 10/2014 | Chou | A47C 3/185 297/344.21 |
| 2015/0296987 A1* | 10/2015 | Hondros | A47D 1/002 297/344.21 |
| 2021/0161296 A1* | 6/2021 | Feng | A47C 3/18 |
| 2023/0173954 A1* | 6/2023 | Jeong | B60N 2/1615 297/344.21 |
| 2023/0294570 A1* | 9/2023 | Line | B60N 2/14 297/344.21 |

\* cited by examiner

PLATE AND ENCLOSURE ASSEMBLY FOR USE IN CONSTRUCTION EQUIPMENT

FIELD

The present application generally relates to a plate and enclosure assembly for use in connection with positioning a seat on a piece of construction equipment, such as a pneumatic or asphalt compactor.

BACKGROUND

Components used in construction equipment must oftentimes meet certain industry standards for safety and other requirements. For example, the seat of a piece of construction equipment, and its associated components, must be able to stay mounted to the construction equipment when subjected for a certain amount of time to a certain amount of force, which force is intended to simulate the construction equipment getting into an accident. If the seat and its components can pass the test, the seat is more likely to remain mounted to the construction equipment in the event of an actual accident and/or failure of a component associated with the seat, improving the safety of the operator of the construction equipment. Examples of such a standard are International Organization for Standardization ("ISO") 5353:1995 ("Earth-moving machinery, and tractors and machinery for agriculture and forestry—Seat index point") and ISO 6683:2005 ("Earth-moving machinery—Seat belts and seat belt anchorages—Performance requirements and tests").

A construction equipment seat is typically rotatable due to an assembly to which the seat is mounted being at least partially affixed to the construction equipment through a rotating piece, such as a bearing. The seat's ability to rotate is particularly useful in certain construction equipment, such as pneumatic and asphalt compactors, which in operation move forward and backward over the same section of ground, necessitating a repositioning of the operator so the operator can always face the direction of movement of the compactor. In the inventors' experience, the bearing is often the component of the seat most likely to fail during testing. Moreover, in view of standard safety requirements, the seat must remain attached to the construction equipment even if the bearing (or another piece associated with the seat) fails. As such, there is a need to ensure the arrest of the bearing, and the maintaining of the attachment of the seat and its associated components to the construction equipment, even if the bearing fails, all while complying with the applicable industry safety standards.

SUMMARY

One aspect of the present application is directed to a plate, comprising: a sensor face; a plate base surface disposed opposite the sensor face in an axial direction; an inner passage connecting the sensor face to the plate base surface; and a blocking surface disposed axially between the sensor face and the plate base surface, wherein the plate base surface is connected to the blocking surface by an inner periphery having an inner periphery diameter, and wherein the blocking surface is connected to the sensor face by an outer periphery having an outer periphery diameter and a middle periphery having a middle periphery diameter, the outer periphery transitioning to the middle periphery at two circumferential reductions.

Another aspect of the present application is directed to an enclosure assembly for use in connection with positioning a seat on a piece of construction equipment, the enclosure assembly comprising: a housing; a plate disposed in the housing, the plate comprising: a sensor face; a plate base surface disposed opposite the sensor face in an axial direction; an inner passage connecting the sensor face to the plate base surface; and a blocking surface disposed axially between the sensor face and the plate base surface, and at least one sensor configured to detect the sensor face to determine a rotational position of the plate, wherein the plate base surface is connected to the blocking surface by an inner periphery having an inner periphery diameter, and wherein the blocking surface is connected to the sensor face by an outer periphery having an outer periphery diameter and a middle periphery having a middle periphery diameter, the outer periphery transitioning to the middle periphery at two circumferential reductions.

DETAILED DESCRIPTION

The present application describes a plate and an enclosure assembly that arrest bearing failures, comply with industry safety standards regarding potential forces sustained by a seat mounted to a piece of construction equipment, and facilitate the rotation of the seat with respect to the construction equipment.

Figure 1:
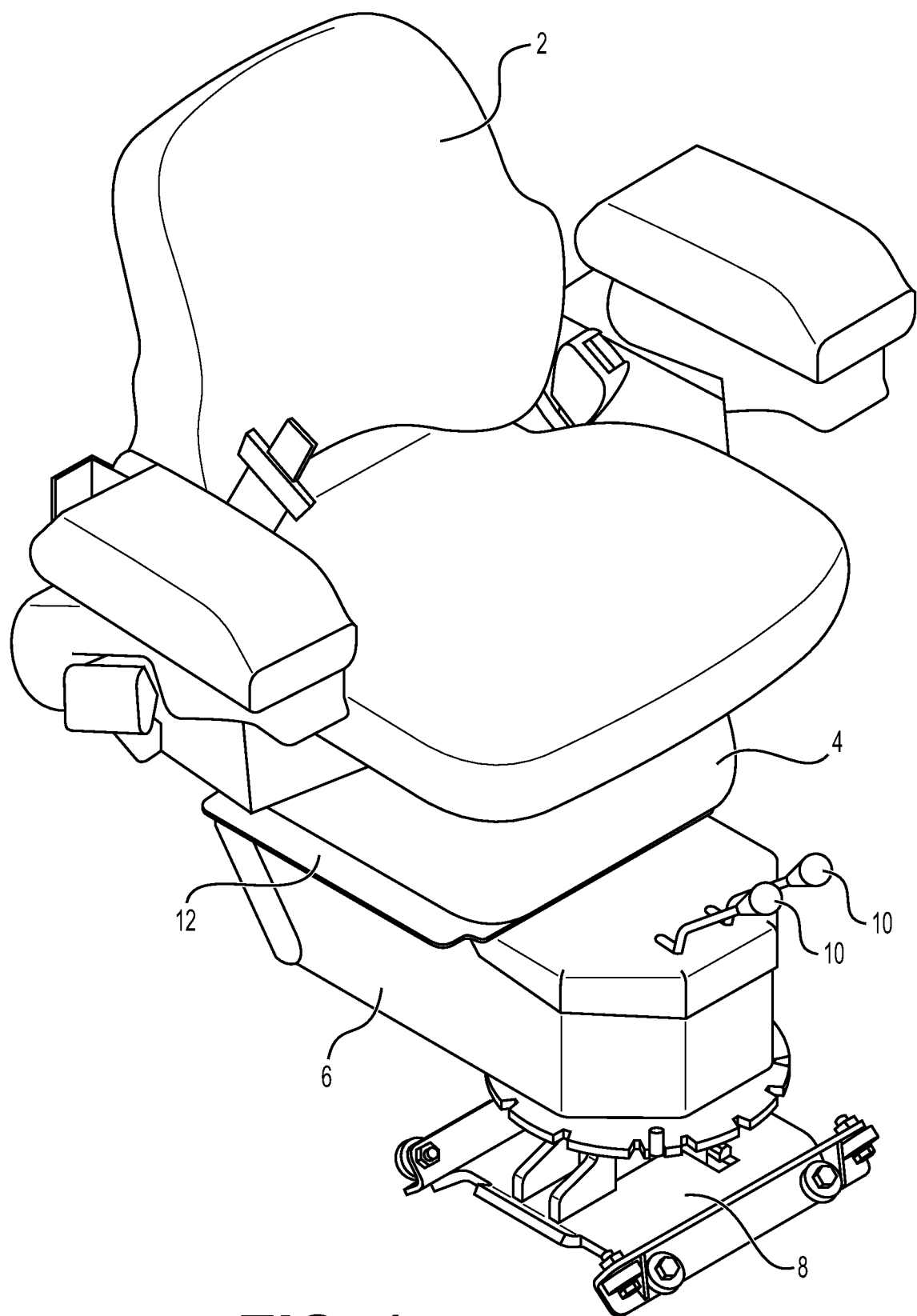
FIG. 1 shows a perspective view of a seat mounted to an enclosure assembly according to the present application.

FIG. 1 shows an exemplary seat 2 for mounting in a piece of construction equipment so as to seat an operator of the construction equipment. Seat 2 is mounted on a seat suspension 4, which allows adjustment of seat 2 to a particular operator and also dampens vertical seat travel during operation of the construction equipment to provide a more comfortable experience for the operator. Seat 2 and suspension system 4 are mounted to enclosure assembly 6, which houses various components associated with the operation and mounting of seat 2 to the construction equipment. Enclosure assembly 6, in turn, is mounted to enclosure assembly support 8, which is fixed to the construction equipment. Enclosure assembly 6, including seat 2 mounted thereto, is rotatable with respect to enclosure assembly support 8 to facilitate rotation of seat 2 with respect to the construction equipment, as desired by the operator. To facilitate the rotation, as well as other adjustment of seat 2, enclosure assembly 6 houses one or more levers 10, which levers 10 are within reach of the operator so as to allow the desired adjustment. Seat suspension 4, and seat 2 attached thereto, are mounted to enclosure assembly 6 at seat suspension mounting surface 12.

Figure 2:
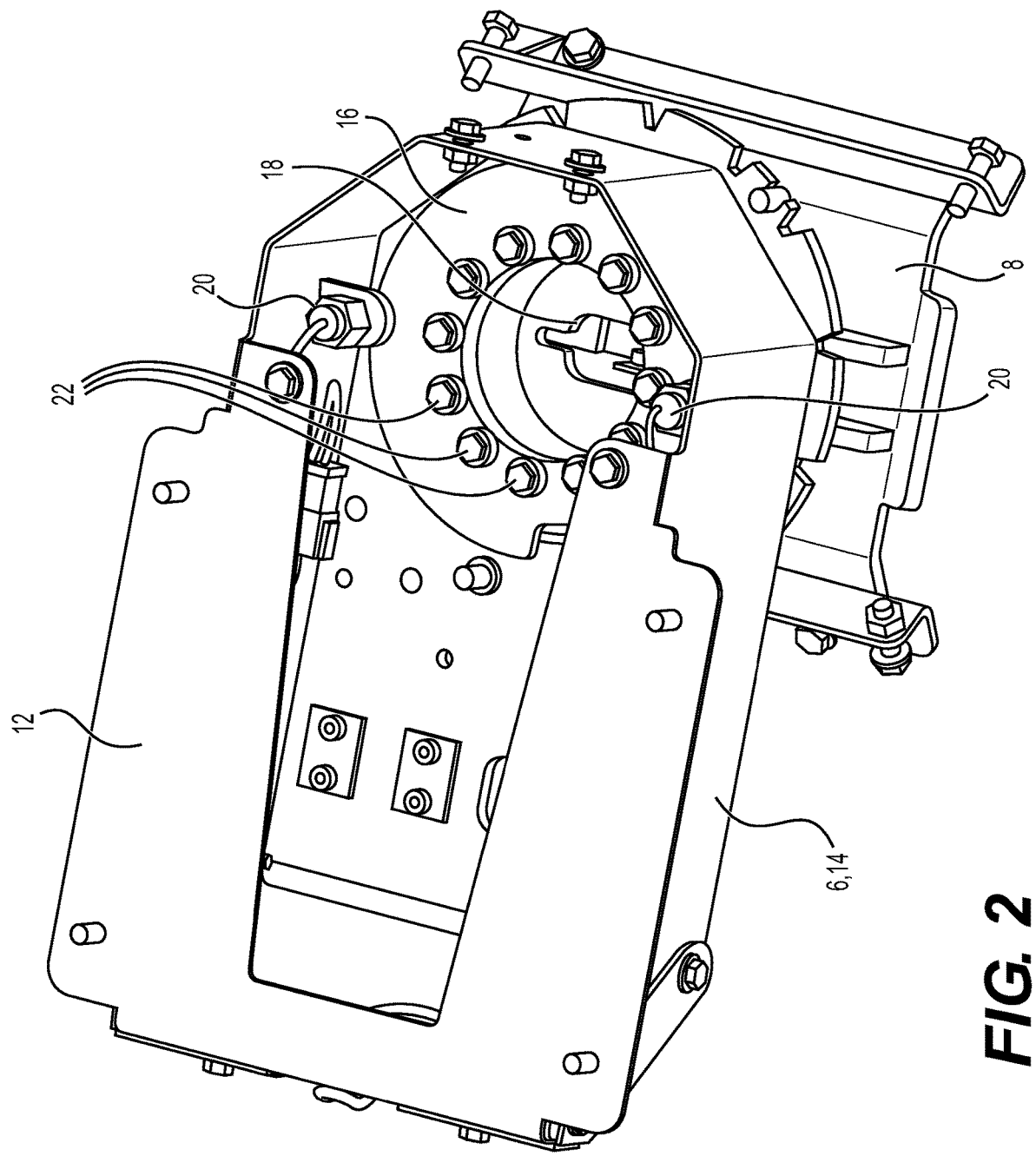
FIG. 2 shows the enclosure assembly of FIG. 1, including a plate according to the present application.

FIG. 2 shows enclosure assembly 6 in greater detail. Seat 2 and suspension system 4 have been removed for clarity. Enclosure assembly 6 includes a housing 14. Seat suspension mounting surface 12 is disposed on housing 14. Plate 16 is disposed within housing 14 of enclosure assembly 6. Plate 16 will be discussed in greater detail below. Enclosure assembly 6 may include one or more openings 18 to allow passage of components (e.g., wires) from inside enclosure assembly 6 to outside enclosure assembly 6 (e.g., in the direction of enclosure assembly support 8), irrespective of the rotation of enclosure assembly 6 with respect to enclosure assembly support 8.

Mounted within enclosure assembly 6 are one or more sensors 20. One or more sensors 20 detect the presence or absence of plate 16 immediately below the respective sensor 20 in part due to the irregular construction of plate 16 (discussed in detail below) and the rotation of enclosure assembly 6 with respect to enclosure assembly support 8. Placing two sensors 20 within enclosure assembly 6 diametrically opposite one another with respect to plate 16 allows sensors 20 to determine a rotational position of enclosure assembly 6 with respect to plate 16 such that a controller of the construction equipment can determine the direction seat 2 is facing (e.g., in the direction of travel of the construction equipment, opposite the direction of travel of the construction equipment, or somewhere in between). The rotational position of seat 2 can be used as an input in controlling operation of the construction equipment (e.g., by instructing the construction equipment to rely on sensor input from only a front of the construction equipment in the direction of travel and to disregard sensor input from a back of the construction equipment in the direction of travel).

A plurality of plate fasteners 22 may be used to fasten plate 16. In an embodiment, the plurality of plate fasteners 22 may be arranged at regular circumferential intervals on plate 16. In an embodiment, plate fasteners 22 may be bolts or the like.

Figure 3:
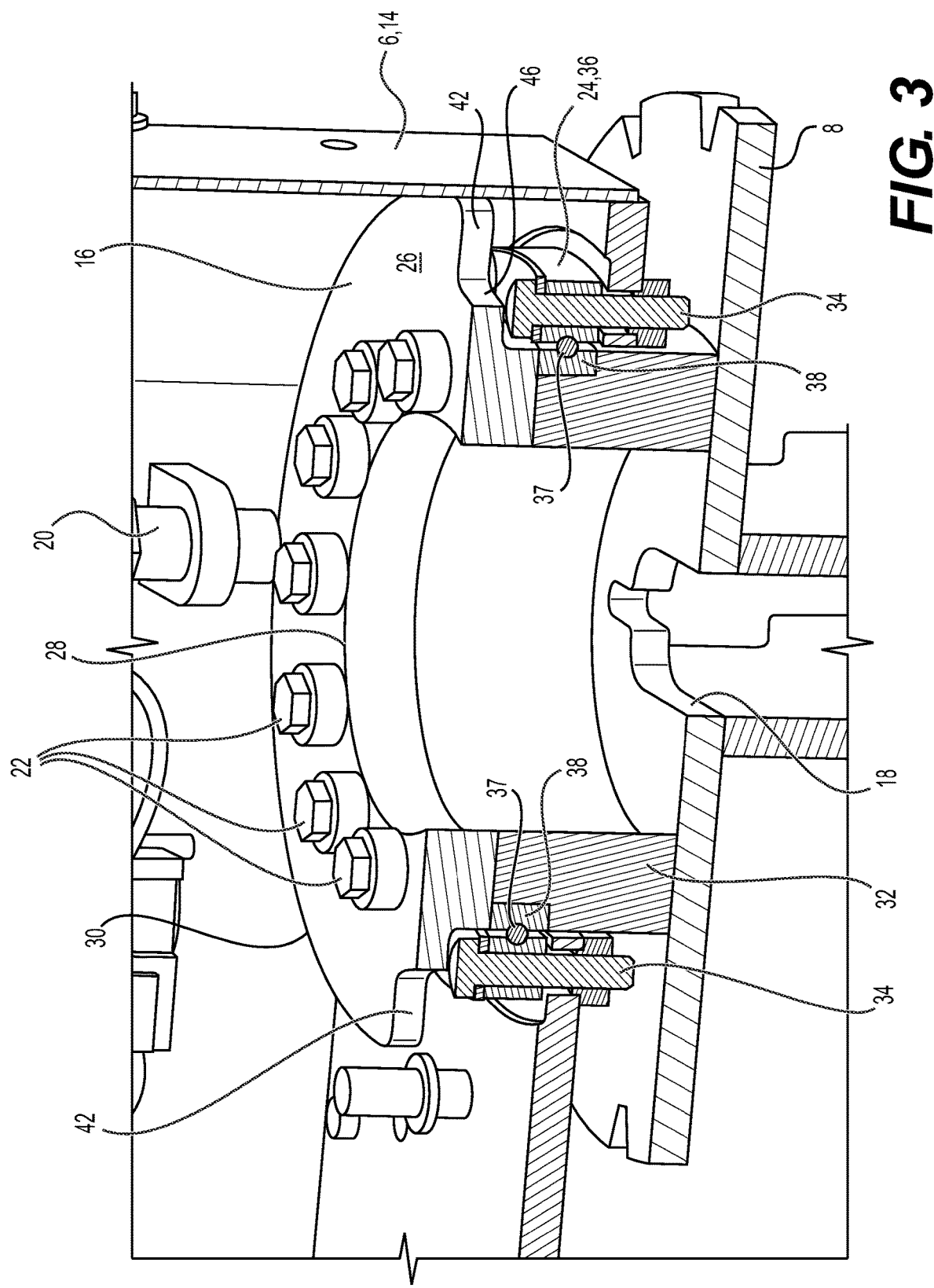
FIG. 3 shows a cross-sectional perspective view of a portion of the enclosure assembly of FIG. 2.
Figure 4:
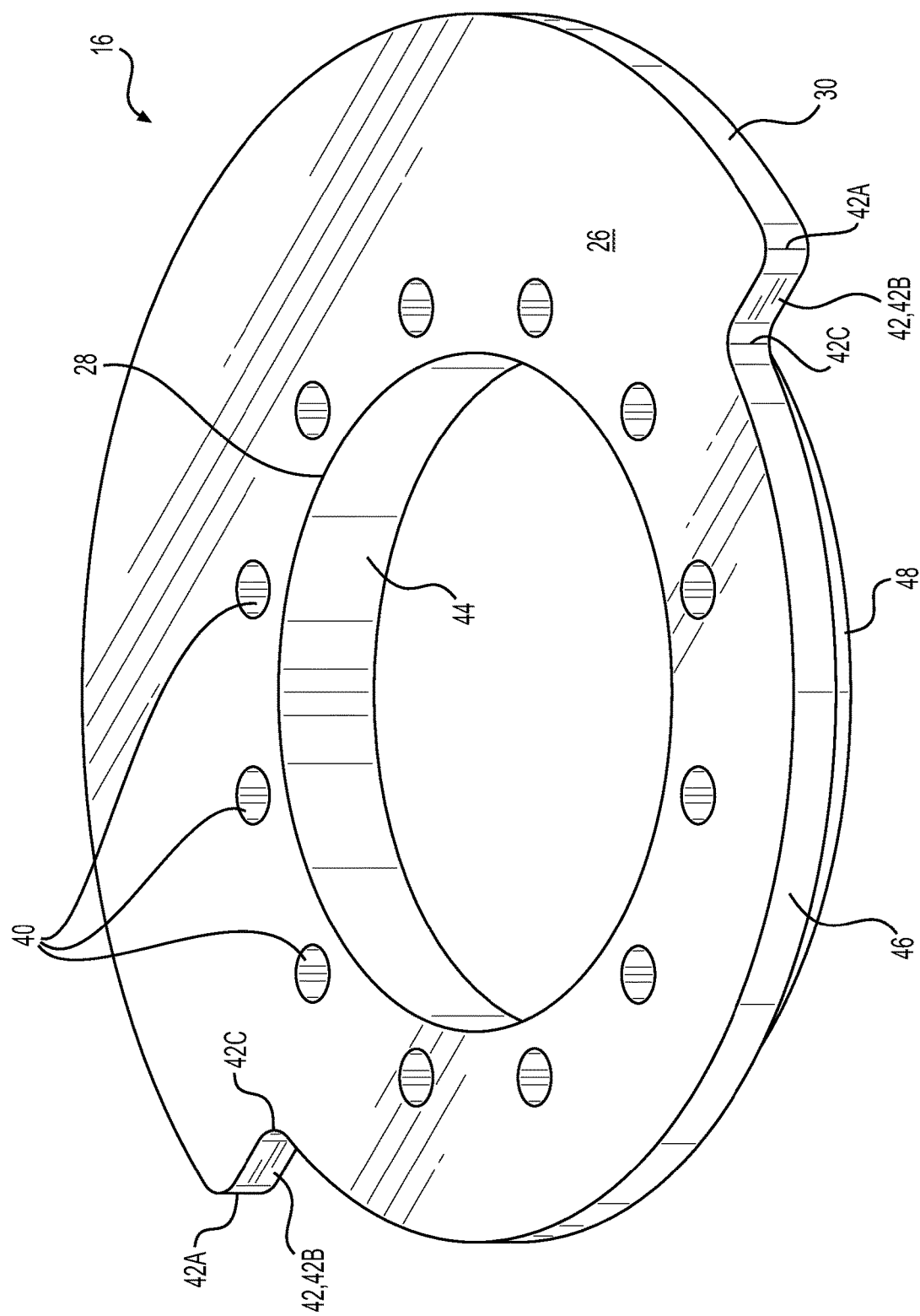
FIG. 4 is a top perspective view of a plate according to the present application.
Figure 5:
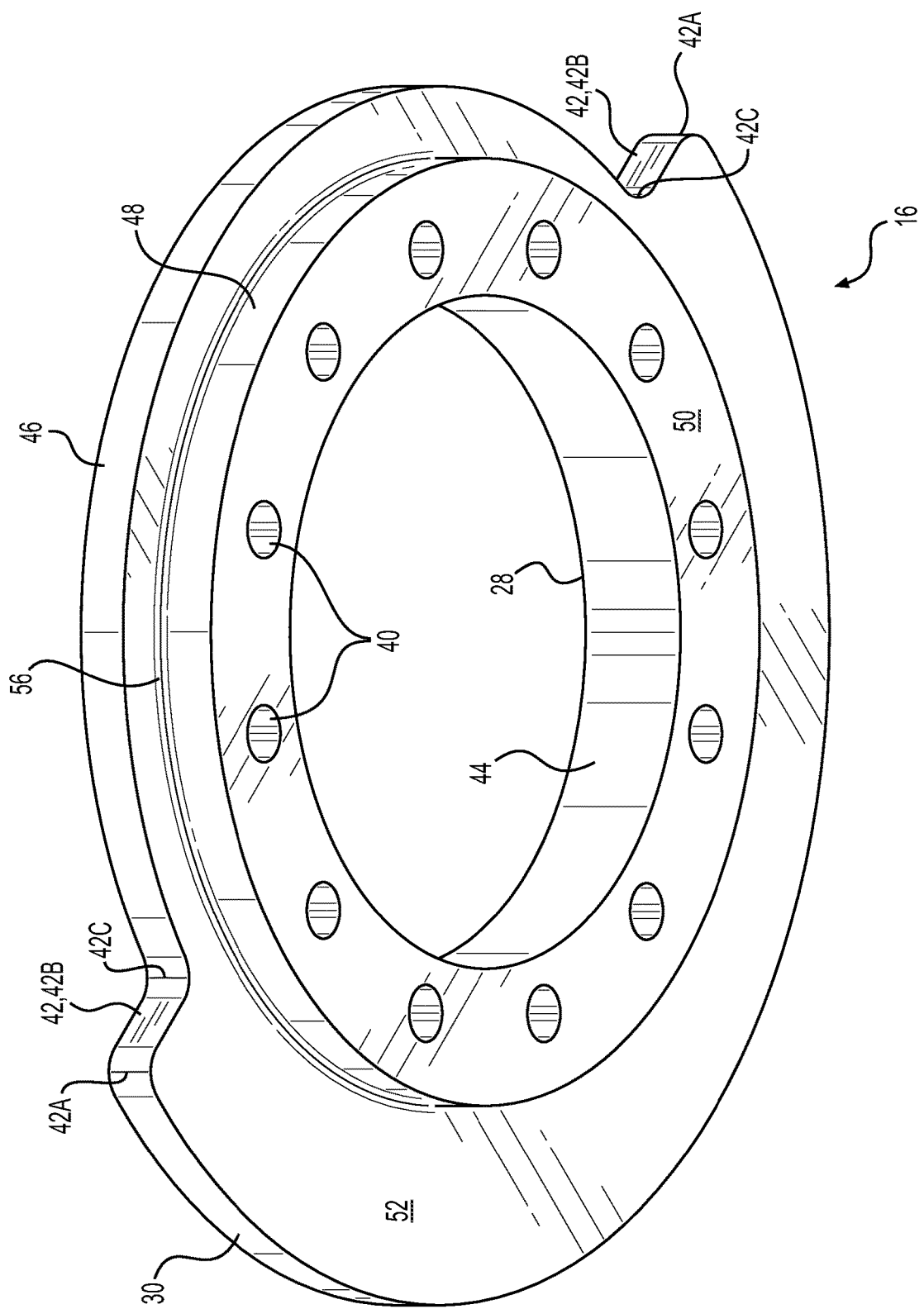
FIG. 5 is a bottom perspective view of the plate of FIG. 4.

To facilitate rotation of seat 2 with respect to the construction equipment to which seat 2 is mounted, enclosure assembly 6 includes a bearing 24, as shown in FIG. 3, which shows a portion of enclosure assembly 6 of FIG. 2 in cross-section. Bearing 24 is disposed beneath plate 16 and around a plate base 32, which is fixed with respect to enclosure assembly support 8. Bearing 24 includes an outer bearing race 36 and an inner bearing race 38, with a plurality of ball bearings 37 disposed therebetween. A plurality of plate fasteners 22 secure plate 16 and inner bearing race 38 to plate base 32. A plurality of bearing fasteners 34 secure outer bearing race 36 to housing 14 of enclosure assembly 6. In this manner, rotation of outer bearing race 36 with respect to inner bearing race 38 (vis-à-vis plurality of ball bearings 37) results in a rotation of enclosure assembly 6 (and seat 2 attached thereto) with respect to enclosure assembly support 8. This allows rotation of seat 2 to be adjusted by the operator of the construction equipment to which seat 2 is attached.

Plate 16 includes a sensor face 26, which is the surface of plate 16 detected by sensors 20, as discussed above. When plurality of plate fasteners 22 fasten plate 16 to plate base 32, in their tightened position plate fasteners 22 come to rest on sensor face 26. Plate 16 also includes an inner passage 28 that in part allows components to pass from the inside of enclosure assembly 6 to the outside of enclosure assembly 6 (i.e., through opening 18), as also discussed above. Plate 16 further includes an outer periphery 30, which adjoins sensor face 26 and is generally perpendicular thereto. Along outer periphery 30 are two circumferential reductions 42, which operate to reduce an overall circumference of plate 16 so as to in part provide plate 16 with its irregular construction.

The foregoing features of plate 16, as well as other features, are shown in FIGS. 4-9, which depict various views of plate 16. As shown, plate 16 includes a plurality of plate fastener holes 40, which plate fastener holes 40 may receive plate fasteners 22. The number of plate fastener holes 40 may vary. In an embodiment, plate fastener holes 40 are arranged circumferentially around inner passage 28. Inner passage 28 also defines an inner circumference 44, which like outer periphery 30, adjoins sensor face 26 and extends generally perpendicularly thereto.

Circumferential reductions 42 have various components and facilitate transition between outer periphery 30 and a middle periphery 46 of plate 16. In an embodiment, circumferential reductions 42 are S-shaped portions in the transition between outer periphery 30 and middle periphery 46. In particular, moving from outer periphery 30 in the direction of a circumferential reduction 42, there is a reduction round 42A, followed by a reduction middle section 42B, then a reduction fillet 42C that completes the transition from outer periphery 30 to middle periphery 46, such that each circumferential reduction 42 comprises a reduction round 42A, a reduction middle section 42B, and a reduction fillet 42C. Reduction middle sections 42B of each circumferential reduction 42 extend generally in a radial direction R of plate 16, which radial direction R is perpendicular to an axial direction A passing through the center of plate 16. Radial direction R and axial direction A are shown in FIGS. 6-9. In an embodiment, reduction middle sections 42B of each circumferential reduction 42 are co-linear (i.e., disposed diametrically opposite one another (at 180° on plate 16)), although it is possible that reduction middle sections 42B (and circumferential reductions 42) may be arranged at another angle with respect to one another. The term "circumferential reduction" encompasses other shapes for the transition between outer periphery 30 and middle periphery 46, including, but not limited to, a straight line, a fixed radius curve, and a variable radius curve, among other shapes.

As shown on a bottom of plate 16 (e.g., as in FIGS. 5-7 and 9), plate 16 includes a plate base surface 50 and a blocking surface 52. Blocking surface 52 is disposed axially between sensor face 26 and plate base surface 50. Sensor face 26, plate base surface 50, and blocking surface 52 can all lie in parallel planes. Inner passage 28 connects sensor face 26 to plate base surface 50. Plate base surface 50, as its name suggests, is the surface of plate 16 that is disposed on plate base 32 of enclosure assembly 6 when plate 16 is properly positioned. A plurality of plate fasteners 22 then pass through plate 16 (including plate base surface 50) and into corresponding holes in plate base 32 so as to affix plate 16 to plate base 32, as shown in FIG. 3.

Plate 16 includes an inner periphery 48, which adjoins plate base surface 50 and is generally perpendicular thereto. Inner periphery 48 merges with blocking surface 52 with, in an embodiment, a merging fillet 54.

Figure 6:
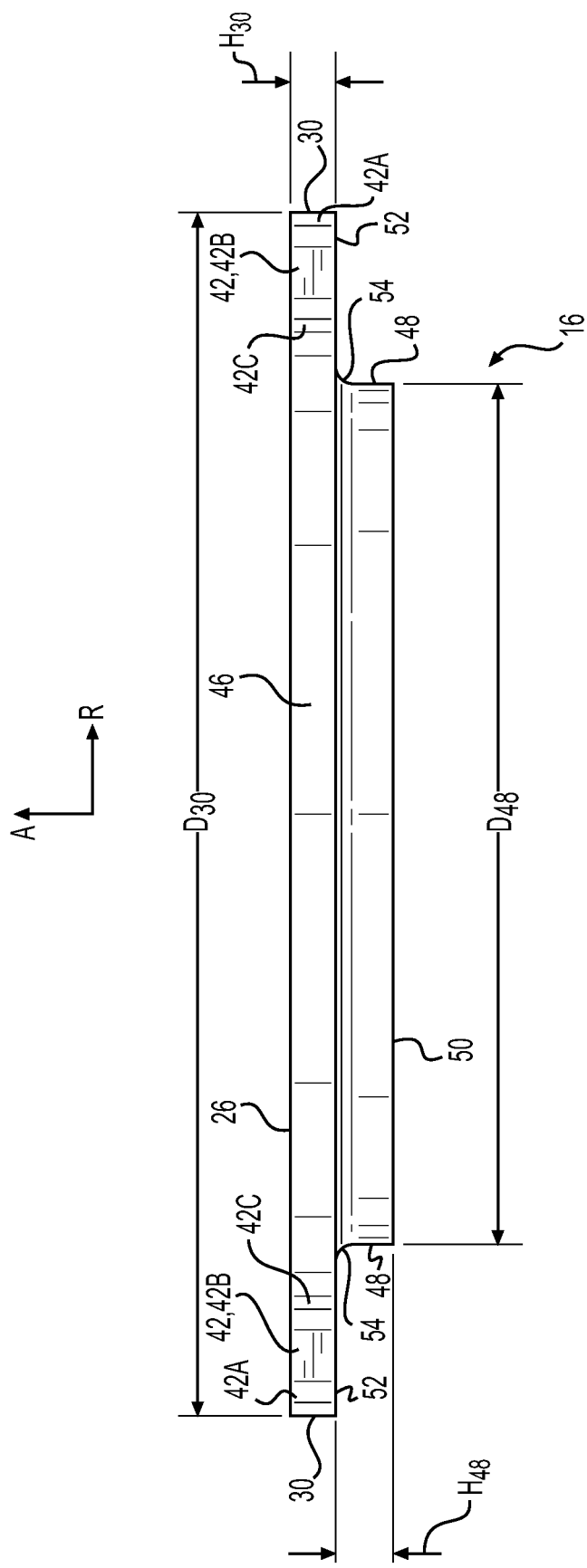
FIG. 6 is a front view of the plate of FIG. 4.
Figure 7:
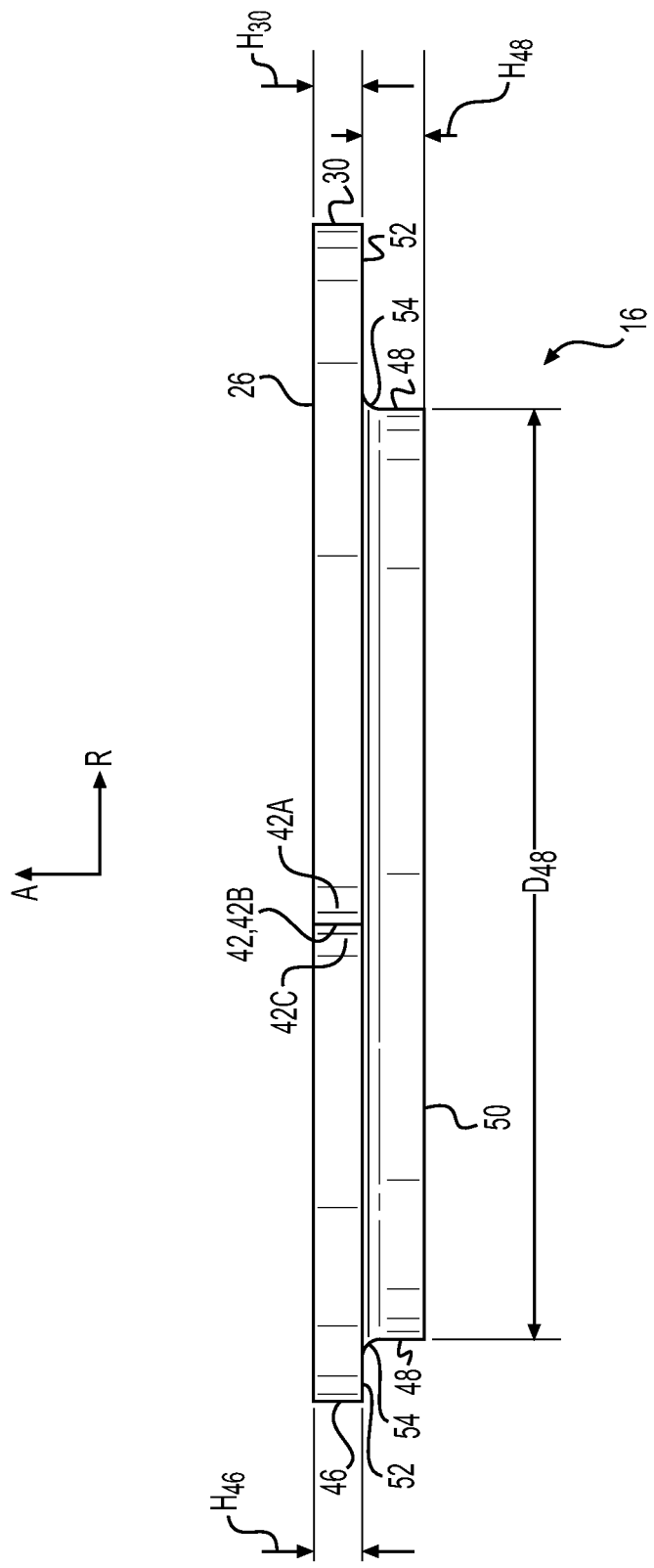
FIG. 7 is a side view of the plate of FIG. 4.
Figure 8:
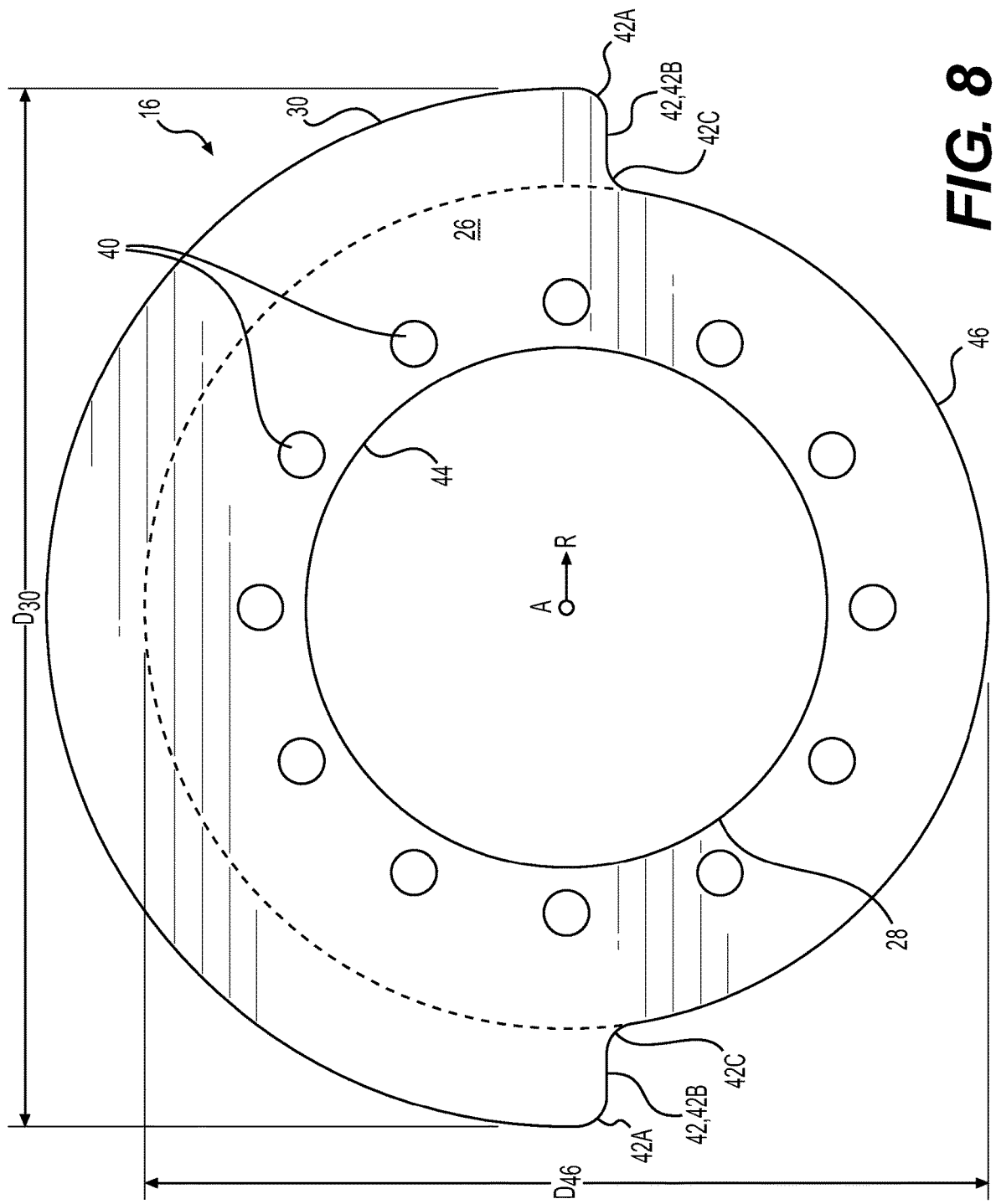
FIG. 8 is a top view of the plate of FIG. 4.
Figure 9:
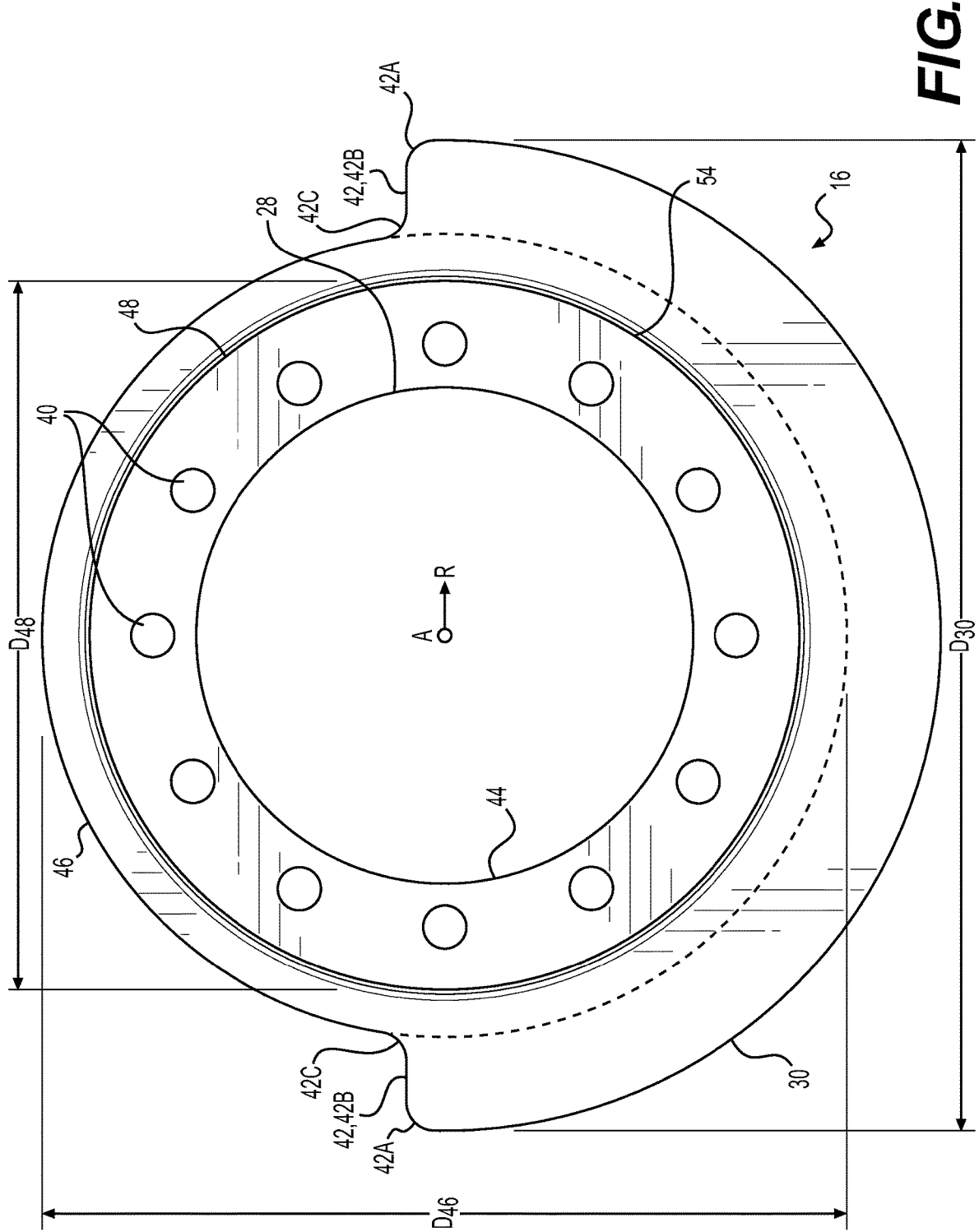
FIG. 9 is a bottom view of the plate of FIG. 4.

Outer periphery 30, middle periphery 46, and inner periphery 48 all have different diameters, as shown more particularly in FIGS. 6-9. Specifically, outer periphery 30 has outer periphery diameter $D_{30}$, middle periphery 46 has middle periphery diameter $D_{46}$, and inner periphery 48 has inner periphery diameter $D_{48}$. Outer periphery diameter $D_{30}$ is larger than middle periphery diameter $D_{46}$, which in turn is larger than inner periphery diameter $D_{48}$. The various peripheries, each having a different diameter, also contributes to the irregular construction of plate 16. As shown in FIGS. 6-7, outer periphery 30, middle periphery 46, and inner periphery 48 all have corresponding heights, namely outer periphery height $H_{30}$, middle periphery height $H_{46}$, and inner periphery height $H_{48}$, respectively. Outer periphery height $H_{30}$ equals middle periphery height $H_{46}$. Inner periphery height $H_{48}$ is approximately equal to outer periphery height $H_{30}$ and middle periphery height $H_{46}$.

In part due to the differing diameters of outer periphery 30 and middle periphery 46, blocking surface 52 of plate 16 forms an overhang when positioned in enclosure assembly 6, as best shown in FIGS. 2-5. In particular, when plate 16 is secured in enclosure assembly 6 (e.g., by plurality of plate fasteners 22), blocking surface 52 overhangs at least some bearing fasteners 34 of plurality of bearing fasteners 34, as well as outer bearing race 36. Consequently, in the event of a failure of bearing 24, blocking surface 52 arrests significant movement of outer bearing race 36. In this manner, plate 16 ensures that enclosure assembly 6 (along with seat 2 attached thereto) does not separate from enclosure assembly support 8, which is fixed with respect to the construction equipment. As such, despite the failure of bearing 24, seat 2 is not separated from the construction equipment, increasing the safety of the operator.

INDUSTRIAL APPLICABILITY

In general, the plate and enclosure assembly of the present application help maintain an operator seat of a piece of construction equipment connected to the construction equipment in the event of a failure of a component associated with the seat (e.g., if the construction equipment is involved in an accident). By helping to retain the seat, the plate and enclosure assembly of the present application improve the safety of an operator of the construction equipment seated in the seat prior to the accident.

At the same time, the plate and enclosure assembly of the present application facilitate rotation of the seat with respect to the construction equipment to which the seat is mounted (vis-à-vis the plate and the enclosure assembly), should the operator of the construction equipment desire to place the seat at a different rotational position. The rotational position of the seat can be sensed using one or more sensors to determine the rotational position of the plate, which enables the rotational position of the seat to be used as an input in controlling the operation of the construction equipment. The plate and enclosure assembly of the present application also help the seat comply with applicable industry safety standards.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The present application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

What is claimed is:

1. A plate, comprising:
   a sensor face;
   a plate base surface disposed opposite the sensor face in an axial direction;
   the plate having an inner passage connecting the sensor face to the plate base surface; and
   a blocking surface disposed axially between the sensor face and the plate base surface,
   wherein the plate base surface is connected to the blocking surface by an inner periphery having an inner periphery diameter,
   wherein the blocking surface is connected to the sensor face by an outer periphery having an outer periphery diameter and a middle periphery having a middle periphery diameter, the outer periphery transitioning to the middle periphery at two circumferential reductions, and wherein each circumferential reduction comprises an S-shaped portion that transitions the outer periphery to the middle periphery.

2. The plate of claim 1, wherein the outer periphery diameter is larger than the middle periphery diameter and the middle periphery diameter is larger than the inner periphery diameter.

3. The plate of claim 1, wherein the sensor face, the plate base surface, and the blocking surface are disposed in parallel planes.

4. The plate of claim 1, wherein an outer periphery height equals a middle periphery height.

5. The plate of claim 4, wherein an inner periphery height is approximately equal to the outer periphery height.

6. The plate of claim 1, the plate having:
   a plurality of plate fastener holes disposed around the inner passage, each of the plurality of plate fastener holes extending from the sensor face to the plate base surface.

7. The plate of claim 1, wherein each S-shaped portion comprises a reduction round in contact with the outer periphery, a reduction fillet in contact with the middle periphery, and a reduction middle section connecting the reduction round and the reduction fillet.

8. The plate of claim 7, wherein each reduction middle section extends generally in a radial direction that is perpendicular to the axial direction.

9. The plate of claim 8, wherein the reduction middle section of each circumferential reduction is co-linear.

10. The plate of claim 1, wherein the outer periphery is perpendicular to the sensor face and the blocking surface.

11. The plate of claim 1, wherein the inner periphery is perpendicular to the plate base surface.

12. The plate of claim 1, wherein the inner periphery merges with the blocking surface with a merging fillet.

13. An enclosure assembly for use in connection with positioning a seat on a piece of construction equipment, the enclosure assembly comprising:
   a housing;
   a plate disposed in the housing, the plate comprising:
      a sensor face;
      a plate base surface disposed opposite the sensor face in an axial direction;
      the plate having an inner passage connecting the sensor face to the plate base surface; and
      a blocking surface disposed axially between the sensor face and the plate base surface, and
   at least one sensor configured to detect the sensor face to determine a rotational position of the plate,
   wherein the plate base surface is connected to the blocking surface by an inner periphery having an inner periphery diameter,
   wherein the blocking surface is connected to the sensor face by an outer periphery having an outer periphery diameter and a middle periphery having a middle periphery diameter, the outer periphery transitioning to the middle periphery at two circumferential reductions, and wherein the outer periphery diameter is larger than the middle periphery diameter and the middle periphery diameter is larger than the inner periphery diameter.

14. The enclosure assembly of claim 13, further comprising:
   a plate base; and
   a bearing disposed around the plate base, the bearing having an inner bearing race and an outer bearing race, the outer bearing race being fixed with respect to the housing by a plurality of bearing fasteners.

15. The enclosure assembly of claim 14, wherein the plate includes a plurality of plate fastener holes, and wherein plate fasteners are disposed in at least two plate fastener holes of the plurality of plate fastener holes so as to secure the plate and the inner bearing race to the plate base.

16. The enclosure assembly of claim 15, wherein the blocking surface overhangs at least one bearing fastener of the plurality of bearing fasteners and the outer bearing race at least partially.

17. The enclosure assembly of claim 13, wherein the at least one sensor comprises two sensors, the two sensors being disposed in the housing diametrically opposite each other with respect to the plate.

18. The enclosure assembly of claim 13, wherein the housing is rotatable with respect to the plate.

19. The enclosure assembly of claim 13, further comprising:
   a seat suspension mounting surface disposed on the housing.

20. A plate, comprising:
   a sensor face;
   a plate base surface disposed opposite the sensor face in an axial direction;
   the plate having an inner passage connecting the sensor face to the plate base surface; and
   a blocking surface disposed axially between the sensor face and the plate base surface,
   wherein the plate base surface is connected to the blocking surface by an inner periphery having an inner periphery diameter,
   wherein the blocking surface is connected to the sensor face by an outer periphery having an outer periphery diameter and a middle periphery having a middle periphery diameter, the outer periphery transitioning to the middle periphery at two circumferential reductions, and
   wherein the outer periphery diameter is larger than the middle periphery diameter and the middle periphery diameter is larger than the inner periphery diameter.

* * * * *